(12) United States Patent
Bray et al.

(10) Patent No.: US 11,772,893 B1
(45) Date of Patent: Oct. 3, 2023

(54) TRANSITION COMPONENTS FOR GAPS IN SHUTTLE RAILS

(71) Applicant: Amazon Technologies, Inc., Seattle, WA (US)

(72) Inventors: Michael Alan Bray, Elkhorn, NE (US); Rajeev Dwivedi, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/533,865

(22) Filed: Nov. 23, 2021

(51) Int. Cl.
*B65G 1/04* (2006.01)
*B65G 41/02* (2006.01)
*B65G 1/137* (2006.01)

(52) U.S. Cl.
CPC ......... *B65G 1/0492* (2013.01); *B65G 1/1371* (2013.01); *B65G 1/1373* (2013.01); *B65G 41/02* (2013.01); *B65G 1/0478* (2013.01); *B65G 2203/042* (2013.01)

(58) Field of Classification Search
CPC ..... E01B 7/10; E01B 7/12; E01B 7/16; E01B 7/30; E01B 11/24; E01B 11/28; E01B 11/20; E01B 11/42; E01B 11/58; E01B 11/56; E01B 11/60; E01B 25/04; E01B 25/06; E01B 25/34; B65G 1/0492
USPC .................................................. 246/455, 457
See application file for complete search history.

(56) References Cited

U.S. PATENT DOCUMENTS

| | | | | |
|---|---|---|---|---|
| 206,684 | A * | 8/1878 | Morgan | E01B 11/58 238/210 |
| 402,371 | A * | 4/1889 | Weber | E01B 11/58 238/210 |
| 758,964 | A * | 5/1904 | Green | E01B 7/30 246/457 |
| 1,239,338 | A * | 9/1917 | Beam | E01B 7/00 246/457 |
| 1,378,425 | A * | 5/1921 | Rosebrook | E01B 11/42 238/218 |
| 2,722,384 | A * | 11/1955 | Buhrer | E01B 11/28 238/218 |
| 5,531,409 | A * | 7/1996 | Willow | E01B 7/10 246/458 |
| 7,640,863 | B2 * | 1/2010 | Minges | B65G 1/0492 104/130.09 |
| 9,122,566 | B2 * | 9/2015 | Bastian, II | G06F 17/00 |
| 11,286,112 | B2 * | 3/2022 | Frederiks | B65G 1/0492 |
| 11,453,553 | B2 * | 9/2022 | York | B07C 5/36 |

* cited by examiner

*Primary Examiner* — Mark C Hageman
(74) *Attorney, Agent, or Firm* — Eversheds Sutherland (US) LLP

(57) ABSTRACT

Systems and methods are disclosed for transition components for gaps in shuttle rails. An example system configured to transport items may include a shuttle configured to support an item, where the shuttle includes a first wheel. The first wheel may have a first side surface, a second side surface, and a middle portion that together form a v-groove. The system may include a first rail configured to engage the first side surface and the second side surface, a second rail configured to engage the first side surface and the second side surface, where the second rail is separated from the first rail, and a first transition block coupled to the first rail. The first transition block may be configured to transfer a load of the shuttle from the first side surface and the second side surface to the middle portion of the wheel.

20 Claims, 11 Drawing Sheets

US 11,772,893 B1

TRANSITION COMPONENTS FOR GAPS IN SHUTTLE RAILS

BACKGROUND

As users increasingly make online purchases, fulfillment of such purchases and other orders may become increasingly complicated. For example, a fulfillment center may have output of upwards of one million packages per day. With such demands, efficiency of logistics related to processing orders and packages may be important. For example, use of equipment to move or otherwise handle objects may improve efficiency. However, such equipment may create chokepoints or cause bottlenecks in fulfillment center operations. Accordingly, improvements in various operations and components of order fulfillment, such as improvements to picking technology, sorting technology, transport technology, packing technology, and so forth may be desired, such that manual efforts can be redirected to different tasks.

Figure 1:
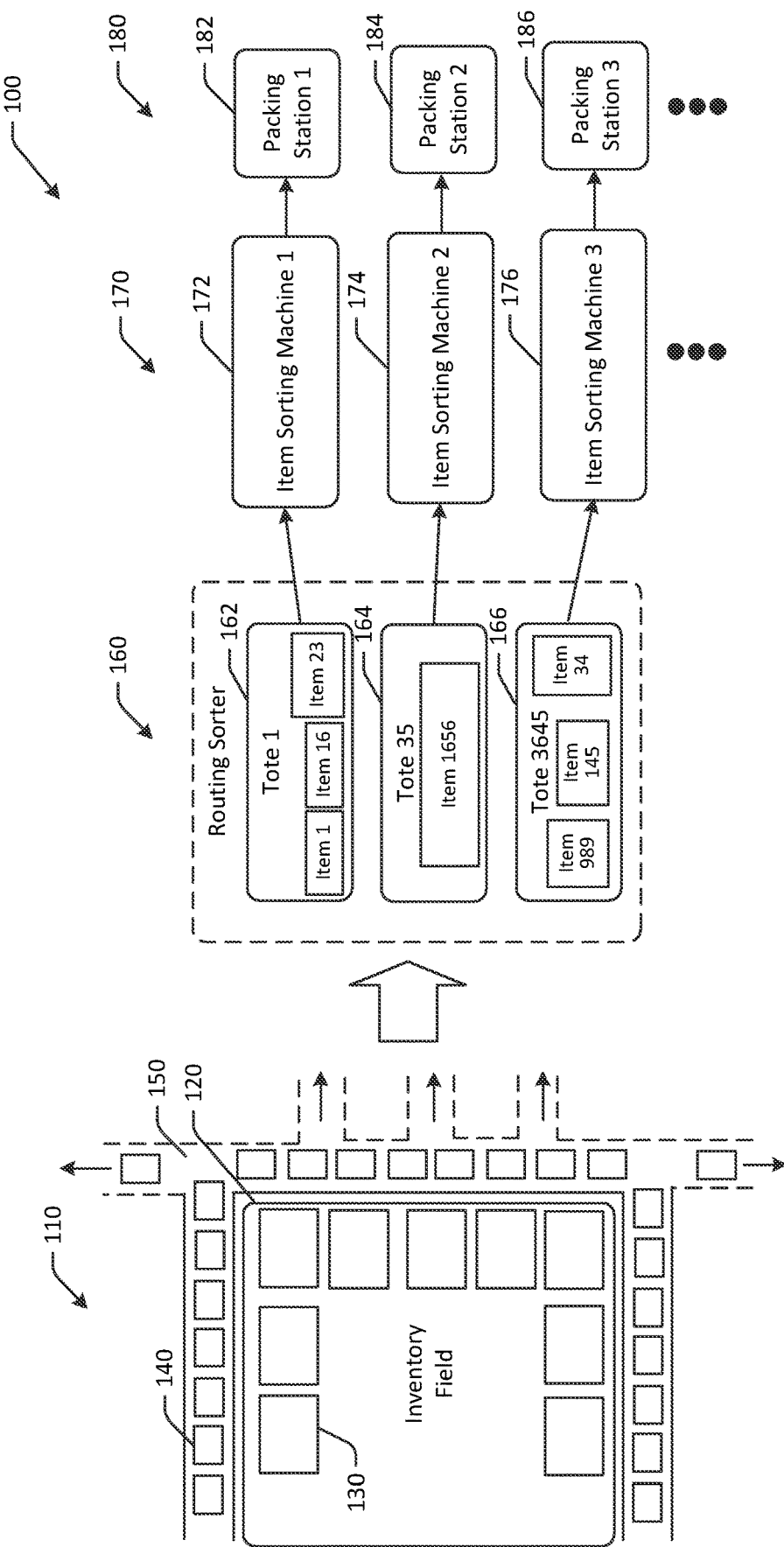
FIG. 1 is a hybrid schematic illustration of an example use case for transition components for gaps in shuttle rails in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Fulfillment centers may be used to fulfill online purchases and other orders. For example, fulfillment centers may include product inventory that may be pulled when an order for a particular product or multiple products is placed. In some instances, the product(s) may be packed and shipped from the fulfillment center. However, the process of obtaining the product(s), packing the product(s), and shipping the product(s) may be complicated due to the amount of inventory, the number of orders to process, the size of the fulfillment center, and/or other factors. In addition, a portion of the fulfillment center designated for packing or shipping may be different than the portion of the fulfillment center designated for holding product inventory. As a result, transportation of products in an order may be time consuming.

Moving items or objects through a fulfillment center may require handling of the item itself. For example, picking the item from inventory, placing the item into a container, removing the item from a container, and so forth may all be examples of actions for which an item may need to be handled. In addition, different items may have different types of packaging. For example, some items may come in boxes, some items may come in loose bags, some items may come shrink wrapped, some items may not have any packaging, and so forth. Humans may be able to manually handle individual items with ease. However, robotic handling of individual items may require various levels of dexterity. Moreover, fulfillment centers may include lengthy conveyors that may be used to transport objects, such as packages, products, items, or other objects, as well as containers that may be at least partially full of objects.

In a typical warehouse environment, such as that illustrated in FIG. 1, items may be transported through various means such as conveyors, belts, shuttles, etc. as they undergo different operations like picking, sorting, storing, shipping/dispatch, and so forth. In some of these cases, containers may be used to transport items, either individually or in groups, from one location to another. For instance, transporting items from a pick station to a sort station may involve the item(s) being picked into a container, such as a tote, which may then be transported via a shuttle.

Transport of containers or items (e.g., individual items or multiple items, etc.) may involve the use of container shuttles that move on one or more rails to transport a container from one location to another. For example, a container of items may be loaded onto a shuttle, and the shuttle may transport the container from an inventory field to a sortation system or other location. Shuttles may be used to transport containers and/or one or more items from a first location to a second location.

At times, such shuttles may transition from one set of rails to another. For example, when moving onto or off a lift or elevator platform, the shuttle may traverse a gap between adjacent sets of rails. Such transitions may result in peening, marring, or other damage to the wheels of the shuttle. This may be because of the weight and speed of the shuttle, the impact on the wheels, the material used to form the wheels, and so forth. Such damage may ultimately reduce longevity of the shuttle wheels, and result in increased maintenance and/or shuttle downtime. Accordingly, transition components for gaps in shuttle rails that reduce damage to shuttle wheels may be desired.

To solve such issues, embodiments of the disclosure include transition components for gaps in shuttle rails that reduce damage to shuttle wheels as the shuttle traverses or crosses over a gap between adjacent sets of shuttle rails. Such transition components may reduce marring, peening, and other types of damage that may occur, thereby improving shuttle wheel performance, increasing shuttle wheel longevity, and reducing shuttle maintenance requirements and associated downtime. Transition components may include machined end blocks that use otherwise untouched areas of the shuttle wheels to transfer the load from one set of rails to the next. Any impact as a result of the gap that the shuttle crosses is transferred to a portion of the individual shuttle wheel that is not critical for shuttle movement, so any peening that occurs at the impact location does not affect long term shuttle performance. As a result, throughput of fulfillment centers may be improved, and/or logistics of fulfillment center operations may be less complicated.

Referring to FIG. 1, an example use case 100 for transition components for gaps in shuttle rails is depicted in accordance with one or more embodiments of the disclosure. Although discussed in the context of online orders, other embodiments may be directed to any suitable use case where containers or items are transported, such as instances where objects are picked from inventory, placed into containers, containers are transported, and so forth.

In FIG. 1, a fulfillment center may be a traditional fulfillment center and may include an inventory field 110, a routing sorter 160, one or more item sorting machines 170, and one or more packing stations 180. The inventory field 110 may include a storage platform, or a portion of the fulfillment center at which products picked from product inventory are placed. Robots may be used to pick products from inventory and to deliver to the robotic storage platform in some instances, while in other instances, manual labor or a combination thereof may be used to pick products. The picking process at the robotic storage platform may include locating a product in an order, obtaining the product, and sending the product to a robotic storage platform, such as via a conveyor belt. In the illustrated embodiment, products at the robotic storage platform may be placed in a container, such as a tote.

The inventory field 110 may include multiple items that are in inventory. The items may be used to fulfill orders. The inventory field 110 may be a robotic field in some instances. One or more picking stations 130 may be positioned along a perimeter 120 of the inventory field 110. The picking stations 130 may be manually operated or may include robotic components, or a combination thereof. In some instances, picking of items from the inventory field 110 may be completed by robots that include automated robotic arms, where the items are delivered to the picking stations 130 after being retrieved from the inventory field 110. Any number of picking stations 130 may be included, and the picking stations 130 may be located in a different position than that illustrated in FIG. 1.

In a traditional fulfillment center, such as that illustrated in FIG. 1, one or more conveyors 150 may be disposed about the inventory field 110. For example, conveyors 150 may be disposed along the perimeter 120 of the inventory field 110. The conveyors 150 may run adjacent to the picking stations 130 in some embodiments. Any suitable conveyor configuration may be used. In the illustrated example, the conveyors 150 may include belts or rollers that run alongside the picking stations 130 and include one or more paths to one or more routing sorters.

The conveyors 150 may be used to transport one or more containers, such as totes 140. For example, as totes 140 move along the conveyors 150, items may be moved from the picking stations 130 into respective totes 140. The totes 140 may be associated with particular item sorting machines, and may be moved using the conveyors 150 to a routing sorter 160. In contrast, embodiments of the disclosure may not include some or all of the conveyors 150, and instead may include rails that may be used to guide shuttles from one location to another. The rails may be used with transition components for gaps in shuttle rails as described herein.

The routing sorter 160 may be configured to route, divert, or otherwise guide certain totes to an item sorting machine. The routing sorter 160 may include any combination of ramps, slides, rollers, arms, guides, and/or other components to route totes to a particular item sorting machine. At the routing sorter 160, totes including products that have been picked may be routed to the appropriate or designated item sorting machine. For example, the routing sorter 160 may determine an identifier associated with the tote, and may determine an item sorting machine associated with the tote using the identifier. The routing sorter 160 may route or direct the tote to the appropriate item sorting machine.

A number of item sorting machines 170 may be coupled to the routing sorter 160. For example, a first item sorting machine 172, a second item sorting machine 174, a third item sorting machine 176, and so forth may be coupled to the routing sorter 160. The routing sorter 160 may optionally guide totes to the item sorting machines to which they are assigned. For example, a first tote 162 may include item 1, item 16, and item 23, and may be assigned to the first item sorting machine 172. The routing sorter 160 may therefore route the first tote 162 to the first item sorting machine 172 for sortation of the respective items. A second tote 164 may include item 1656, and may be assigned to the second item sorting machine 174. The routing sorter 160 may therefore route the second tote 164 to the second item sorting machine 174 for sortation of the item. A third tote 166 may include item 989, item 145, and item 34, and may be assigned to the third item sorting machine 176. The routing sorter 160 may therefore route the third tote 166 to the third item sorting machine 176 for sortation of the respective items.

Some or all of the item sorting machines may optionally be associated with one or more packing stations 180 that may be used to pack items into a shipment when a multi-item order is complete. For example, the first item sorting machine 172 may be coupled to a first packing station 182, the second item sorting machine 174 may be coupled to a second packing station 184, the third item sorting machine 176 may be coupled to a third packing station 186, and so forth. The item sorting machines may be configured to receive items from totes that have one or more, or multiple, items. The number of totes and/or the number of items associated with respective item sorting machines may be balanced, and multiple totes may be routed to the first item sorting machine 172 and the second item sorting machine 174 at the same time.

At any of the stages of the example fulfillment process of FIG. 1 where handling of containers is used, shuttle powering systems as described herein may be used for transition components for gaps in shuttle rails.

Embodiments of the disclosure include transition components for gaps in shuttle rails. Certain embodiments may improve processing speed and/or throughput of fulfillment centers. Certain embodiments may improve performance of mechanical equipment for sortation and/or consolidation of items. Certain embodiments improve shuttle performance by reducing damage that occurs to shuttle wheels along surfaces needed for shuttle movement. While described in the context of online orders, aspects of this disclosure are more broadly applicable to other forms of object handling.

Example embodiments of the disclosure provide a number of technical features or technical effects. For example, in accordance with example embodiments of the disclosure, certain embodiments of the disclosure may improve processing speed, throughput, and/or efficiency of fulfillment centers. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of the embodiments disclosed herein are also within the scope of this disclosure. The above-described embodiments and additional and/or alternative embodiments of the disclosure will be described in detail hereinafter through reference to the accompanying drawings.

Illustrative Embodiments and Use Cases

Figure 2:
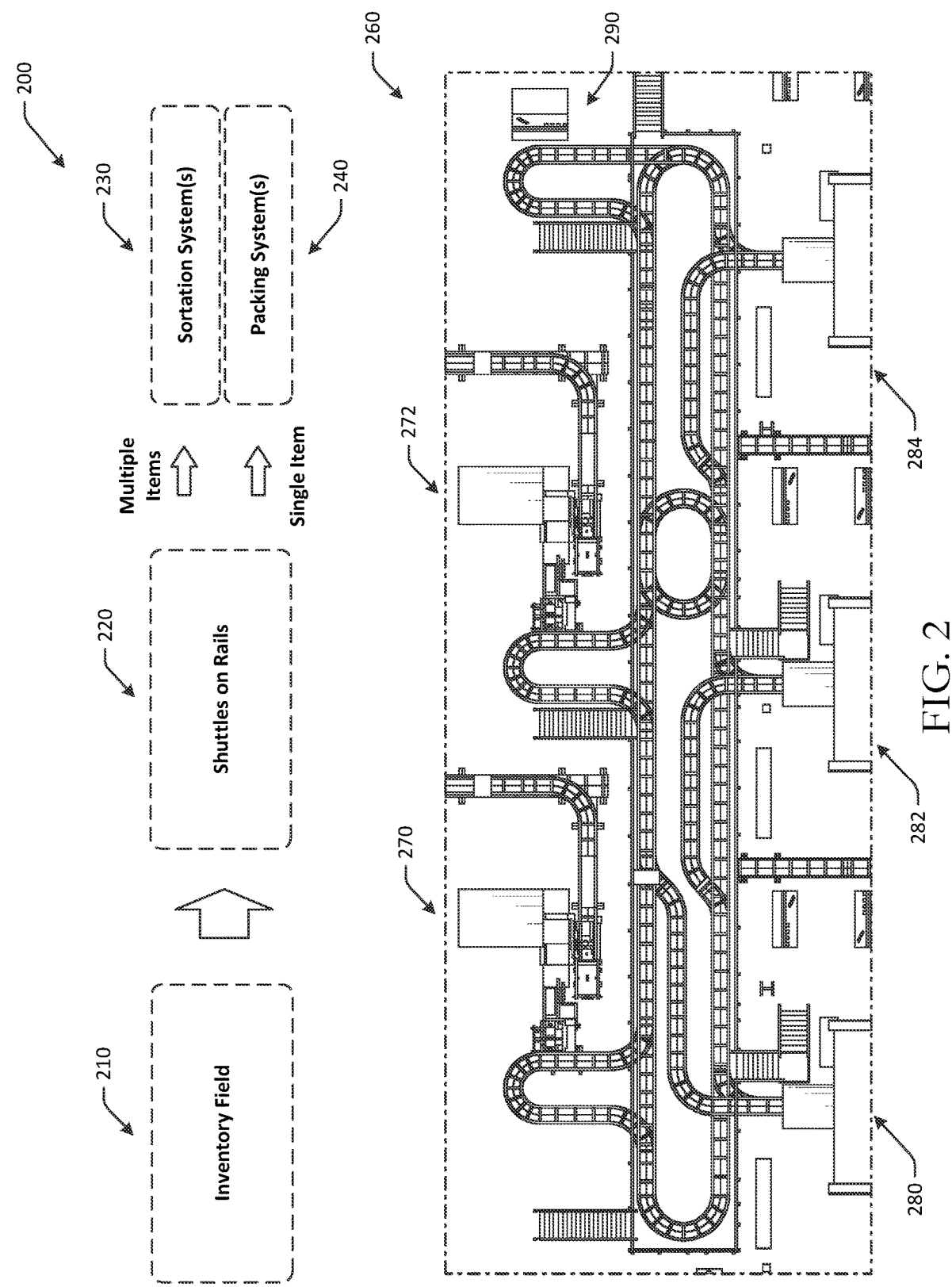
FIG. 2 is a schematic illustration of an example use case and facility layout for transition components for gaps in shuttle rails in accordance with one or more embodiments of the disclosure.

FIG. 2 is a schematic illustration of an example use case 200 and facility layout for transition components for gaps in shuttle rails in accordance with one or more embodiments of the disclosure. Other embodiments may include additional or fewer components. The illustration of FIG. 2 may not be to scale, and may not be illustrated to scale with respect to other figures.

In FIG. 2, a fulfillment center may include an inventory field 210, at which products or other items may be stored in inventory. As the items are ordered in online orders, the products may be picked from the inventory field 210 and routed for downstream processing in the fulfillment center. The items may be picked manually, using vehicles, or a combination thereof.

The picked products may be placed into one or more containers and the containers may be transported using one or more shuttles, such as one or more shuttles on rails 220. In some embodiments, items may be transported by the shuttles without using containers. The shuttles on rails 220 may include container shuttles that are configured to transport items and/or containers from one location to another via rails. The rails may include switching rail components that allow for the shuttles to move from one set of rails to another. The shuttles on rails 220 may transport containers from the inventory field 210 to one or more downstream processes, such as a sortation system 230, or a packing system 240. For example, the sortation system 230 may be a system at which items picked from the inventory field 210 may be re-sorted into respective totes or other containers for particular orders. For example, items for different orders may be placed into containers that are transported by the shuttles on rails 220 from the inventory field 210. The containers may be sent to the sortation system 230 for sorting into particular orders. The packing system 240 may be a station at which one or more items associated with an order may be packed into a box or other container for shipment. A shipping label may be applied and the package may be dispatched to a loading dock or elsewhere for shipment. Other destinations or downstream processes in addition to, or instead of, the sortation systems and packing systems may be used.

A rail system 260 is depicted in schematic view in FIG. 2. In other embodiments, the rail system may be a matrix-based rail system that includes more than one level, such as that illustrated in FIG. 3B. The rail system 260 is an example of a network of rails that may be used by shuttles to transport containers from one location to another. The network of rails may include locations at which a shuttle can be directed to a straight path or to a loop, turn, oval, circle, and/or other geometries that involve a change in direction of a shuttle on the rails. Such changes in direction may be implemented using switching rail components. Transition components as described herein may be used with adjacent sets of rails included in the rail system 260, such as between rails on a lift and rails on a level of a sortation system, as discussed with respect to FIG. 3B. The rail system 260 may include rails that link various systems, such as sortation systems, to each other and/or to other systems, such as container handling systems, manual induction systems 290, and so forth. For example, the rail system 290 may link a first sortation system 270 to a second sortation system 272, as well as to a first container handling system 280, a second container handling system 282, a third container handling system 284, and so forth. The rail system 260 may be used to connect any of the systems to each other and/or other systems.

Shuttles may move along the rails of the rail system 260. The shuttles may include linear drive motors or other drive components. Some drive components may provide a drive force via electromagnetism. As a result, one or more electromagnets may be disposed along the network of rails. Shuttles may optionally include a conveyor belt that may have a first set of one or more raised flaps and a second set of one or more raised flaps. The first set of raised flaps may form a first barrier along a first open-ended side of the shuttle, and the second set of raised flaps may form a second barrier along a second open-ended side of the shuttle to prevent items rolling off the conveyor belt. The shuttles may include an onboard drive motor configured to move the conveyor belt in a forward direction and/or a reverse direction. The shuttles may include a magnet disposed on a lower surface of the shuttle. The magnet may be used to propel and/or secure the shuttle. For example, the magnet may prevent the shuttle from moving while the vehicle is in motion and the linear drive motor is engaged.

Figure 3A:
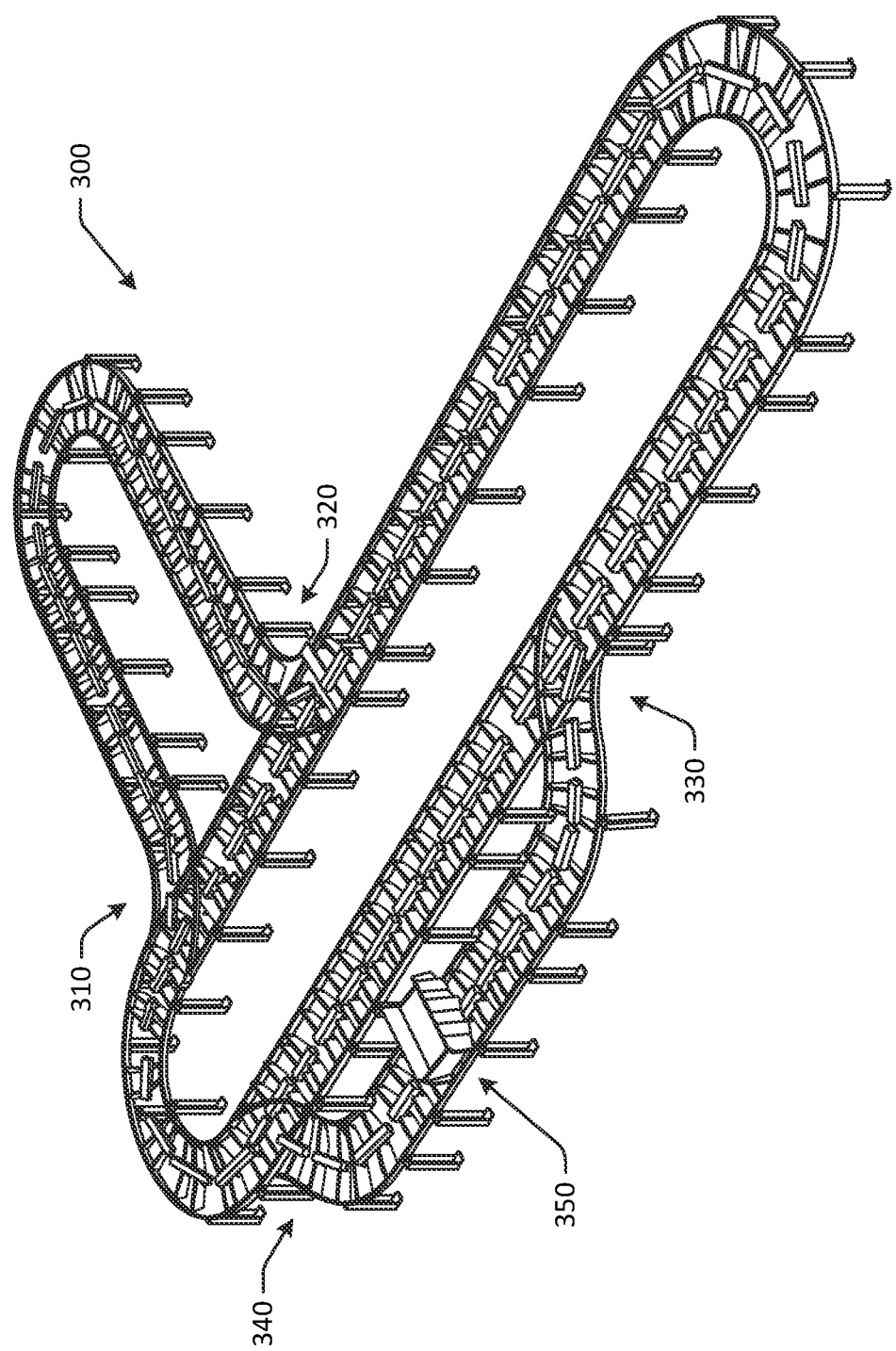
FIGS. 3A-3B are schematic illustrations of a perspective view of a shuttle rail system and a perspective view of a shuttle matrix in accordance with one or more embodiments of the disclosure.
Figure 3B:
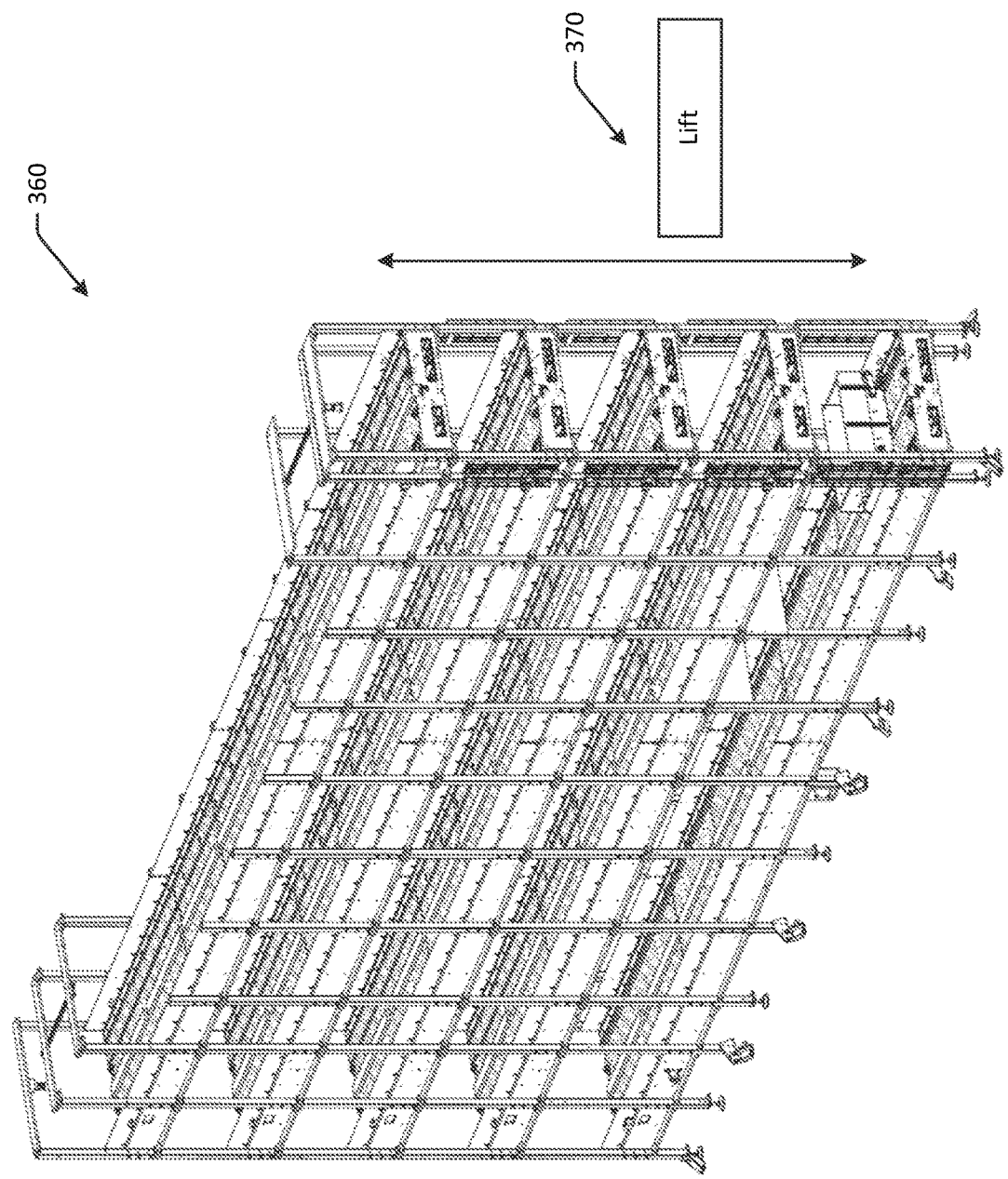

FIGS. 3A-3B are schematic illustrations of a perspective view of a shuttle rail system and a perspective view of a shuttle matrix in accordance with one or more embodiments of the disclosure. Other embodiments may include additional or fewer components. The illustration of FIGS. 3A-3B are not to scale, and may not be illustrated to scale with respect to other figures. The system illustrated in FIGS. 3A-3B may be used with the systems described herein for transition components for gaps in shuttle rails discussed with respect to FIGS. 1-2.

In FIG. 3A, the shuttle rail system 300 may be configured to provide rail for switching the direction of a shuttle 350 in an electromagnetically propelled shuttle-on-rail arrangement. Shuttle-on-rail arrangements may be used in many systems, such as sortation systems, pick systems, delivery systems, etc. The shuttle rail system 300 may include rail switch mechanisms to allow the rail to be directed to alternate path. Shuttle-rail arrangements that are based on electromagnetic propulsion, such as linear drive motors, may have sets of electromagnets arranged along the direction of the rails. Shuttles may also have a magnet, such as a permanent magnet, coupled to a lower side of the shuttle. The electromagnet and the permanent magnet may have to be separated by a very narrow gap for optimal performance Such factors may make removal of the shuttle 350 from the shuttle rail system 300 difficult, due to potential unintended interaction between the magnets. Embodiments of the disclosure include systems that power conveyors and other components of shuttles at various fixed locations along the shuttle rail system 300.

The shuttle 350 may be wirelessly powered via inductive coupling using induction coils disposed along the shuttle rail system 300, which may also be located at a curved section of rail. For example, the shuttle rail system 300 may include a first branched path 310, where if shuttles were moving along the shuttle rail system 300 in a clockwise direction, the shuttle could move in either a straight direction along the oval path of the shuttle rail system 300, or may make a left-handed curve onto a separate path of the shuttle rail system 300. Similarly, a second branched path 320 may allow for merging of shuttles that took a left curve at the first branched path 310 to merge back onto the oval path of the shuttle rail system 300. Any number of curved path and straight path intersections may be included in the shuttle rail system 300. For example, the shuttle rail system 300 may include a third branched path 330 and a fourth branched path 340. At any of the branched paths, the shuttle may be removed using the shuttle disengagement mechanisms described herein.

In an alternate embodiment, a shuttle rail system 360 may include one or more levels, such as the multi-level matrix system depicted in FIG. 3B. In such embodiments, individual levels may include tracks along which shuttles may move. A lift 370 may be used to transport shuttles to different levels of the multi-level matrix system. The lift 370 may include a set of rails that engage a shuttle during transport, and the shuttle may traverse a gap to move from the lift 370 onto rails at a particular level of the multi-level matrix. In some instances, rail systems may include combinations of the flat rail system of FIG. 3A and the matrix-based rail system of FIG. 3B.

Figure 4A:
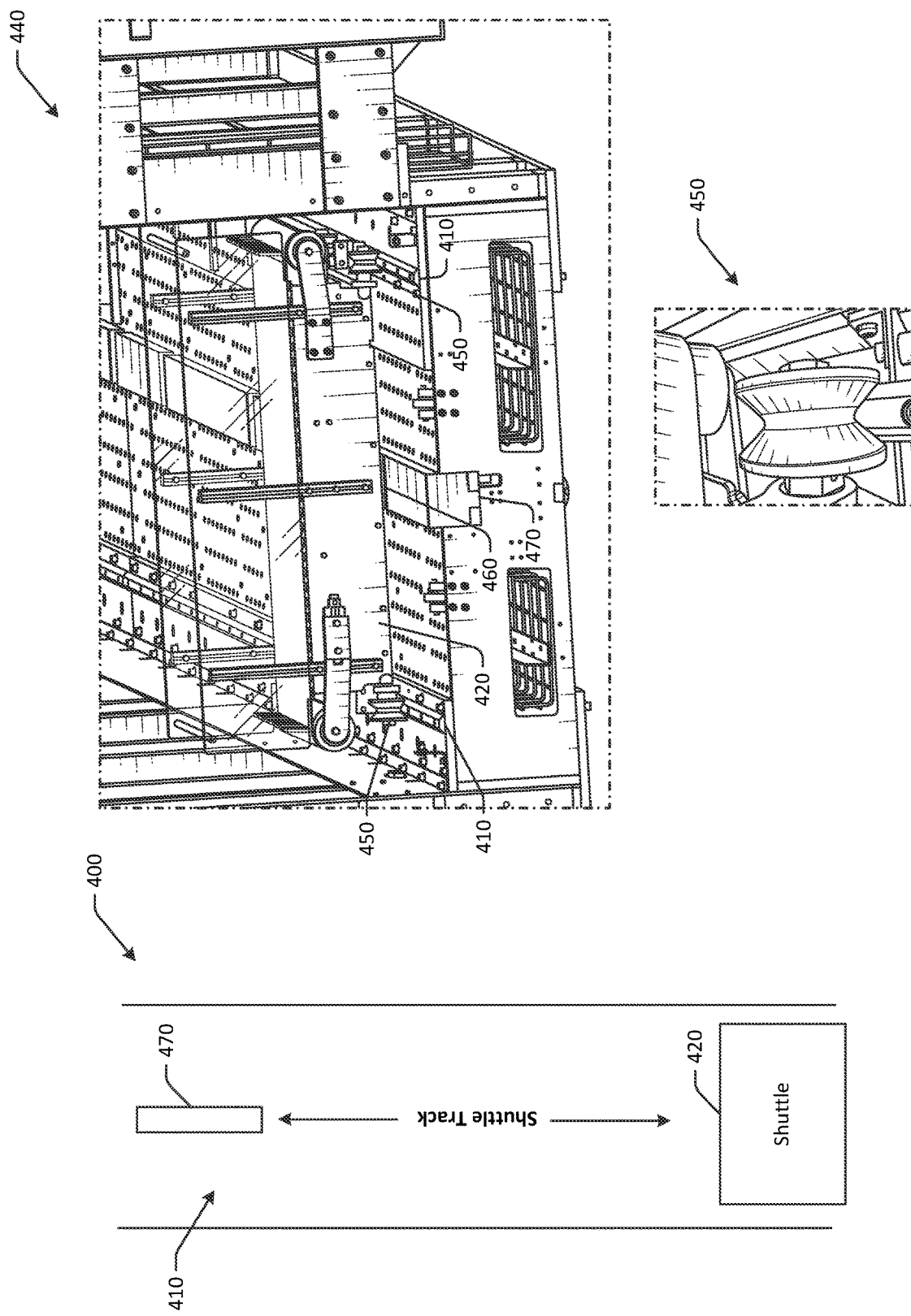
FIGS. 4A-4B are schematic illustrations of various views of portions of a shuttle rail system and transition components for gaps in shuttle rails in accordance with one or more example embodiments of the disclosure.
Figure 4B:
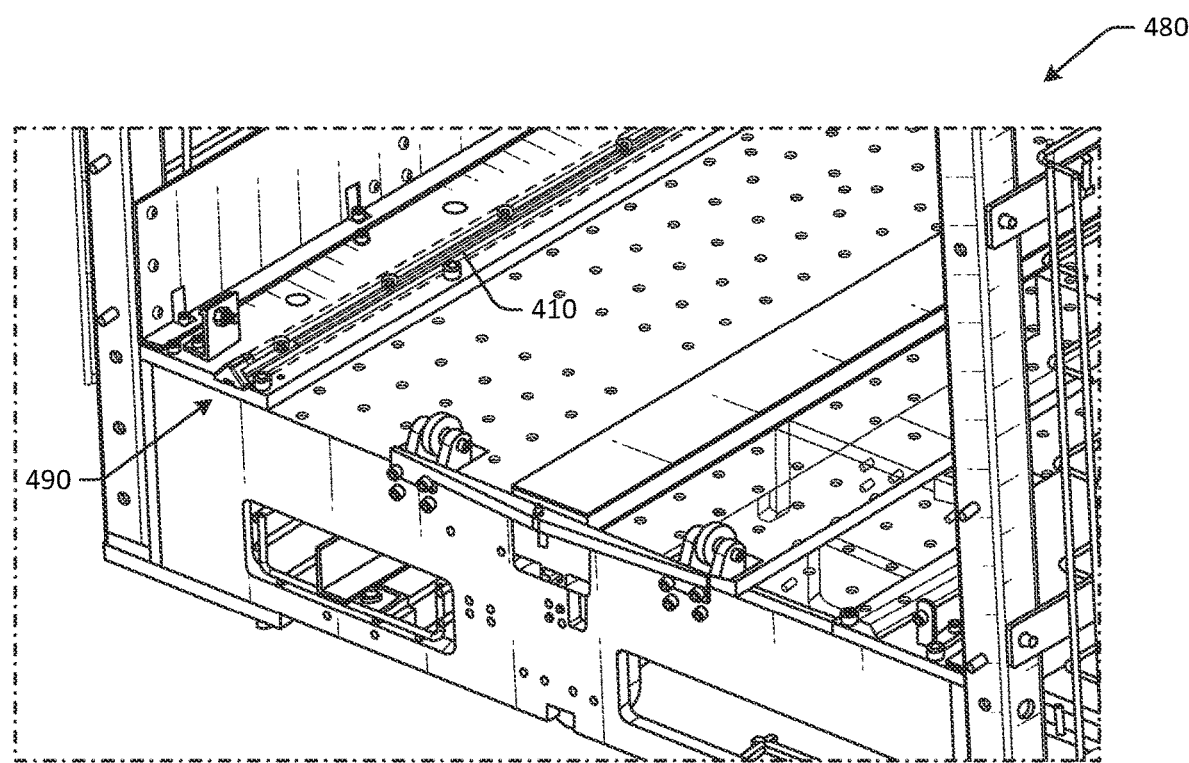
Figure 4B:
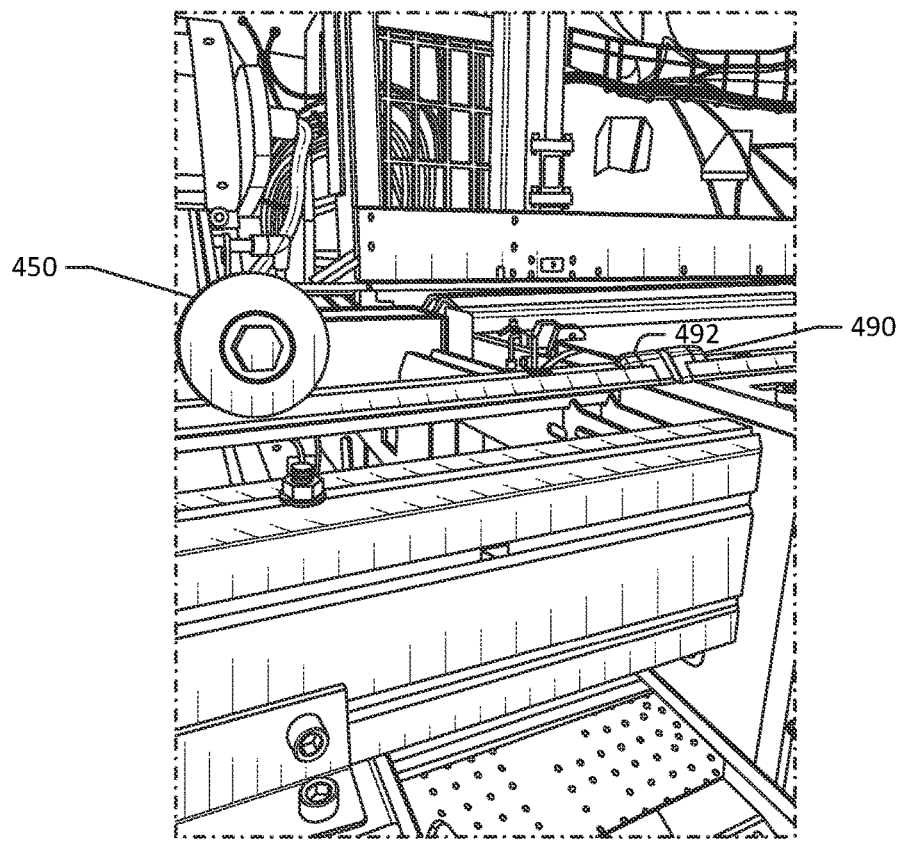

FIGS. 4A-4B are schematic illustrations of various views of portions of a shuttle rail system and transition components for gaps in shuttle rails in accordance with one or more example embodiments of the disclosure. Other embodiments may include additional or fewer components. The illustrations of FIGS. 4A-4B are not to scale, and may not be illustrated to scale with respect to other figures. The system illustrated in FIGS. 4A-4B may include the same shuttle and shuttle rail system discussed with respect to FIGS. 1-3B.

FIG. 4A depicts a portion of the shuttle rail system 400 in a top schematic view. The shuttle rail system 400 may include one or more sets of rails that form a track 410 on which shuttles 420 may ride. The track 410 may guide shuttles 420 to various locations. Each track 410 may include two rails, so as to support two sides of a shuttle 420 on the rails. The shuttle rail system 400 may include a number of supports disposed between the two rails of a track 410. A number of electromagnets 470 may optionally be disposed along the rails at various intervals. The electromagnets 470 may be configured to propel shuttles along the respective sets of rails.

A perspective view 440 in FIG. 4A depicts the shuttle 420 engaged with the shuttle rail system 400. The shuttle 420 may include wheels 450 that engage the track 410. Some embodiments may include four wheels 450, while other embodiments may include different numbers of wheels. Any suitable number and size of wheels may be used to engage with the track 410.

The shuttle wheel 450 is depicted in close-up view in FIG. 4A. The wheel 450 may form a v-groove, where the sidewalls forming the sides of the v-groove may be used for shuttle movement along the track 410 or set of rails. However, the inner portion of the v-groove (e.g., the intersection of the angled sidewalls that forms the V, etc.) may not come into contact with the rails that form the track 410 during movement along the rails. Accordingly, the inner portion of the v-groove may absorb impact when the shuttle 420 traverses a gap between adjacent sets of rails, as damage to the inner portion may not affect shuttle performance or wheel longevity.

The shuttle 420 may include a permanent magnet 460 disposed underneath the shuttle 420. The permanent magnet 460 may interact with the electromagnets 470 to electromagnetically propel the shuttle 420. The electromagnets 470 and permanent magnet 460 may together form a linear synchronous motor in some embodiments.

Although the shuttle 420 is depicted as traveling in a sideways configuration with respect to the shuttle rail system 400 (e.g., a payload on the shuttle 420 may be moving sideways with respect to the shuttle rail system 400, etc.), in other embodiments, the shuttle 420 may be oriented differently.

The shuttle rail system 400 may therefore include the track 410 having a central axis. The track 410 may include a first rail segment on a first side of the central axis and a second rail segment on a second side of the central axis. The shuttle rail system 400 may include the set of electromagnets 470 disposed along the central axis of the track. The shuttle rail system 400 may be used with the shuttles 420, where the shuttles 420 are configured to transport individual items or containers from a first location to a second location using the track 410. The shuttle may include a first pair of wheels 450 disposed at a front end of the shuttle 420, and a second pair of wheels 450 disposed at a rear end of the shuttle 420. In some embodiments, the shuttle 420 may include a conveyor assembly having a central axis that is transverse to the central axis of the track, such as in the embodiment depicted in FIGS. 4A-4B. The shuttle 420 may include the permanent magnet 460 coupled to a lower surface of the shuttle 420. The permanent magnet 460 may be configured to engage with the set of electromagnets 470 to propel the shuttle 420. The shuttle 420 may not include an onboard power source coupled to the conveyor assembly.

In FIG. 4B, an end of the track 410 is depicted in perspective view. The end of the track 410 may be adjacent to a lift or other component of the shuttle rail system. For example, a shuttle may move along the track 410 and pass over the end of the track 410 and onto a lift or elevator to move to another level of a system.

A transition component 490 may be coupled to an end of a rail of the track 410. In some embodiments, each of rails (e.g., both rails) may include the transition component 490. Corresponding transition components may be coupled to the beginning of the rails on the lift or other structure onto which the shuttle will move after leaving the track 410. The transition components on the lift may be arranged in an opposite orientation, such that the features of the respective opposite transition components mirror each other. For example, the transition component 490 may be a first transition block, and a second transition block 492 may be coupled to the rail on the lift or other structure. In this manner, as the shuttle wheel 450 rolls over the first transition block, the shuttle wheel passes the gap, moves onto the second transition block 492, and then engages the rails on the other side of the gap. The transition blocks may act to reduce impact to the shuttle wheel, and, at a minimum, transition impact from the inner sidewalls of the wheel to an inner portion near the intersection of the inner sidewalls of the wheel 450.

Figure 5A:
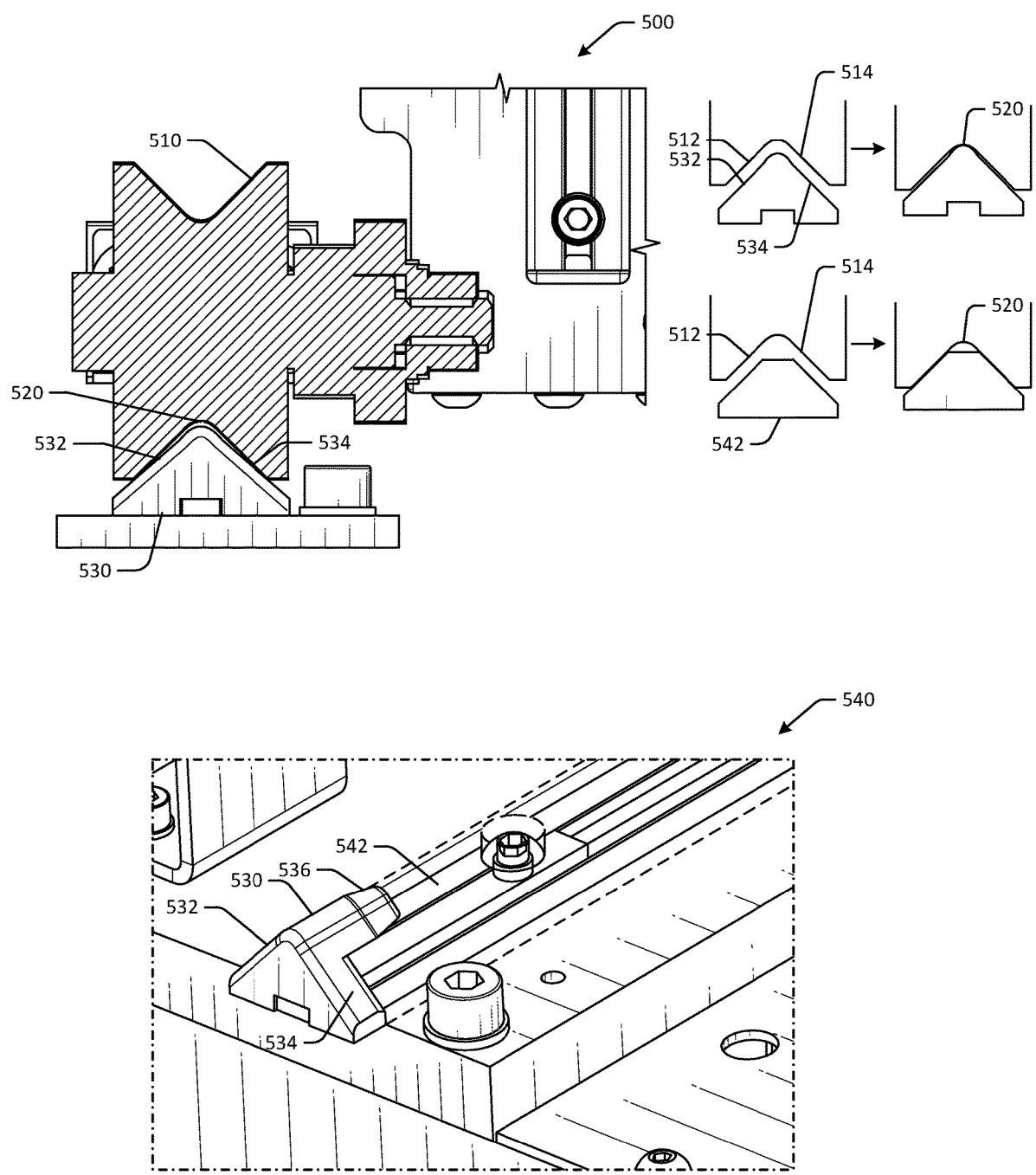
FIGS. 5A-5B are schematic illustrations of a shuttle wheel engaging a transition block in various views in accordance with one or more embodiments of the disclosure.
Figure 5B:
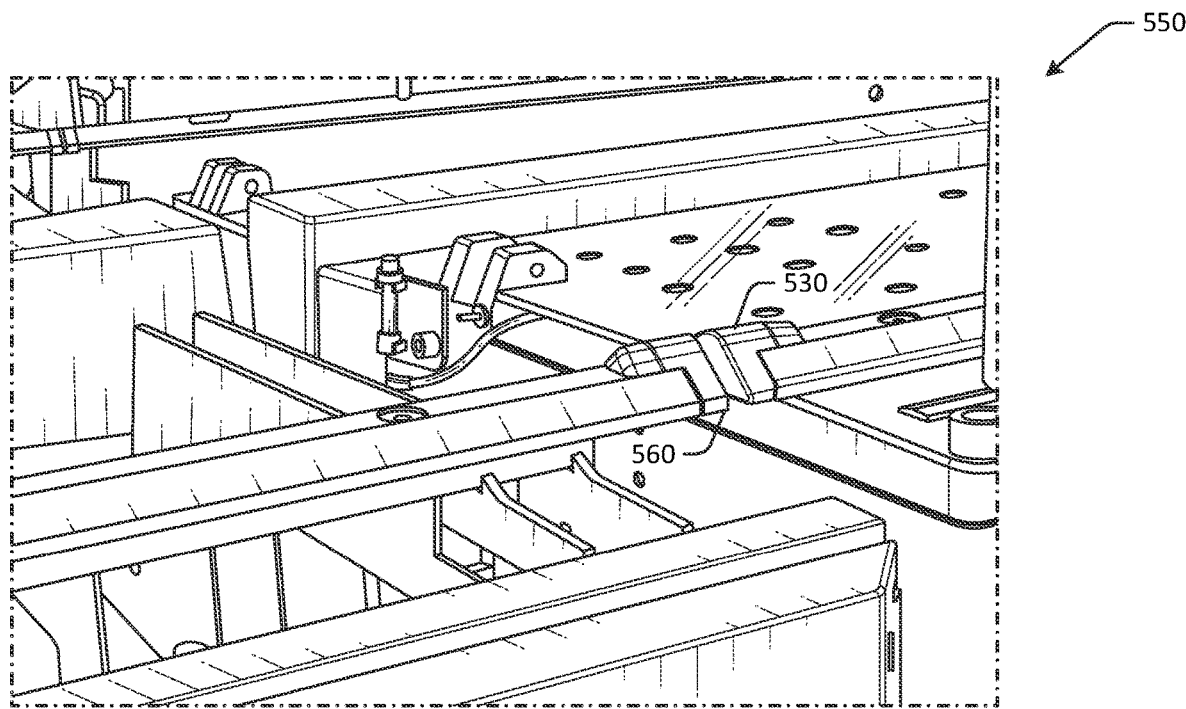
Figure 5B:
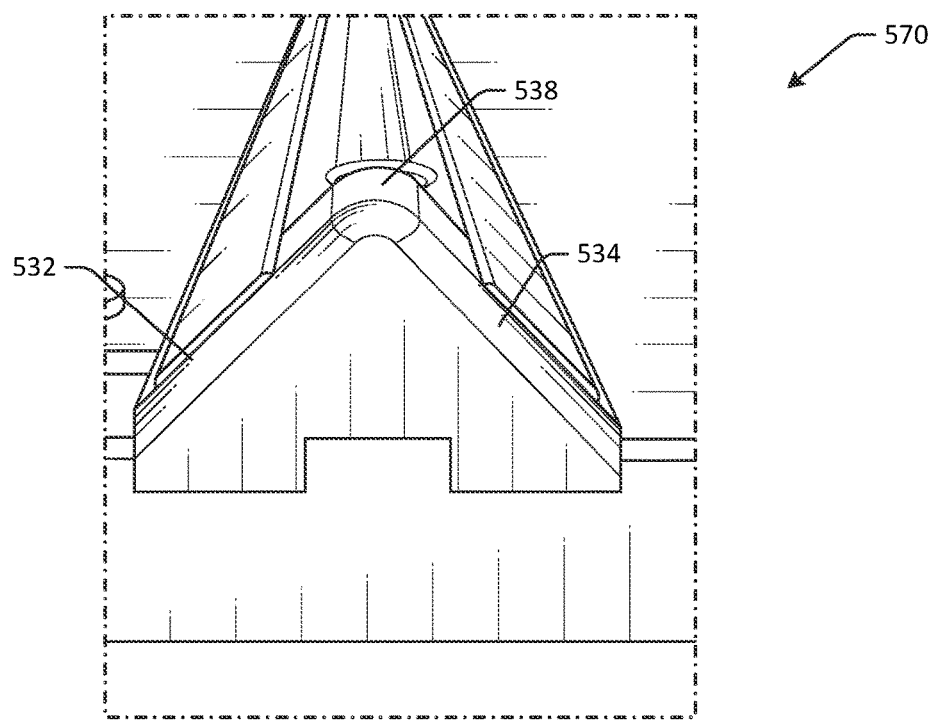

FIGS. 5A-5B are schematic illustrations of a shuttle wheel engaging a transition block or transition component in various views in accordance with one or more embodiments of the disclosure. Other embodiments may include additional or fewer components. The illustrations of FIGS. 5A-5B are not to scale, and may not be illustrated to scale with respect to other figures. The system illustrated in FIGS. 5A-5B may be the same systems discussed with respect to FIGS. 1-4B.

In a cross-sectional view 500 in FIG. 5A, a shuttle wheel 510 is depicted in contact with a transition component 530 coupled to a rail. The transition component 530 is depicted in perspective view 540 as well. As the shuttle wheel 530 moves along the transition component 530 (e.g., from right to left across the page, or from left to right, etc.), different portions of a v-groove of the shuttle wheel 510 may contact the transition component 530. For example, the shuttle wheel 510 may have a v-groove formed by two angled sidewalls, a first sidewall 512 and a second sidewall 514, that intersect at a middle portion or an area 520. The area 520 may not be in contact with the shuttle rails during normal shuttle movement, as depicted in FIG. 5A with a gap between the middle portion or area 520 and a shuttle rail 542. As a result, the area 520 may not be subject to much impact or damage during shuttle movement. However, during transitions between rails and/or when passing over gaps in shuttle rails, the transition component 530 may act to transfer impact from the sidewalls 512, 514 of the v-groove of the shuttle wheel 510 to the area 520. As the shuttle wheel 510 moves along the rail 542 onto the transition component 530, the sidewalls 512, 514 of the shuttle wheel 510 may initially contact sidewalls 532, 534 of the transition component 530. The transition component 530 may include a first angled portion 536 that acts as a ramp to engage the area 520 of the shuttle wheel 510 instead of the sidewalls that form the v-groove. After the area 520 is engaged by a second portion of the transition component 530 and the sidewalls 512, 514 are disengaged, the load of the shuttle may be transferred to the area 520 of the wheel.

As depicted in perspective views 550, 570 in FIG. 5B, the transition component 530 may include a rounded and/or chamfered end 538 that allows for the shuttle wheel 510 to roll smoothly over the edge of the transition component 530 in either direction across the transition component 530. For example, the transition component 530 may be a first transition component, and a second transition component 560 may be disposed on the corresponding rail segment across a gap, where the first and second transition components are arranged in opposite orientations, such that the shuttle wheel 510 rolls off one end of the first transition component and onto an end of the second transition component.

The transition components may be formed of anodized materials and may be mounted to the rails using any suitable materials, such as epoxy. Some embodiments may include an additional aluminum member used to couple the transition component to the rail.

Accordingly, in some embodiments, the transition component 530 may be part of a system configured to transport items, the system including a shuttle configured to support an item, the shuttle having a first wheel, where the first wheel has a first side surface, a second side surface, and a middle portion (e.g., the area 520, etc.) that together form a v-groove, as depicted in the examples of FIGS. 5A-5B. The system may include a first rail configured to engage the first side surface and the second side surface, where the first rail does not engage the middle portion of the first wheel, and a second rail configured to engage the first side surface and the second side surface, where the second rail is separated from the first rail, and where the second rail does not engage the middle portion of the first wheel. The second rail may be part of a lift or elevator, and may therefore optionally be configured to move vertically with respect to the first rail.

The first rail may not contact a first relief groove (e.g., the area 520) of the v-groove of the first wheel, and the second rail may not contact a second relief groove of the v-groove of the second wheel. Similarly, the first shuttle transition block may not contact the first side surface or the second side surface of the v-groove of the first wheel depending on where the wheel is along the transition block, and the second shuttle transition block may not contact the first side surface or the second side surface of the v-groove of the second wheel depending on where the wheel is along the transition block.

As depicted in FIG. 5B, the first transition block may be in a first orientation and the second transition block may be in a second orientation that is opposite the first orientation. A first gap may separate the first shuttle transition block and the opposite shuttle transition block.

Figure 6A:
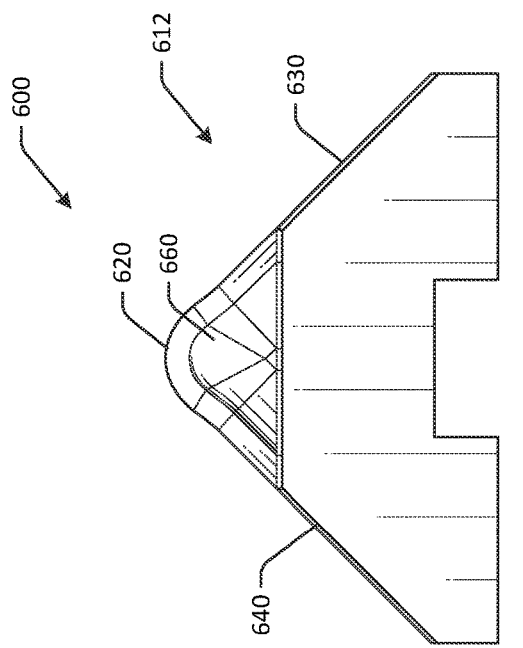
FIGS. 6A-6B are schematic illustrations of a transition component in various views in accordance with one or more embodiments of the disclosure.
Figure 6A:
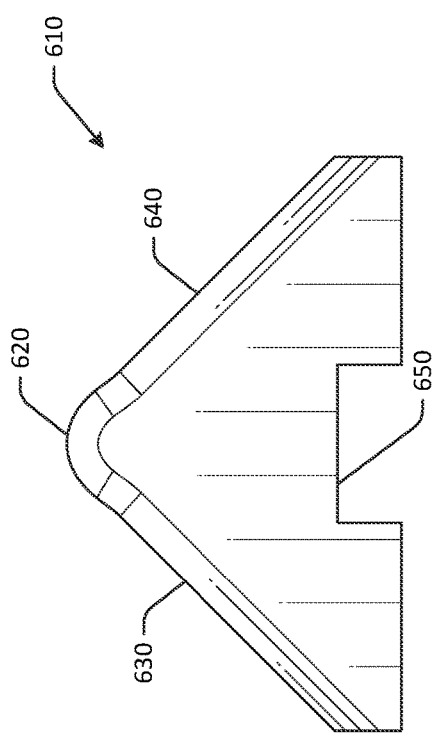
Figure 6A:
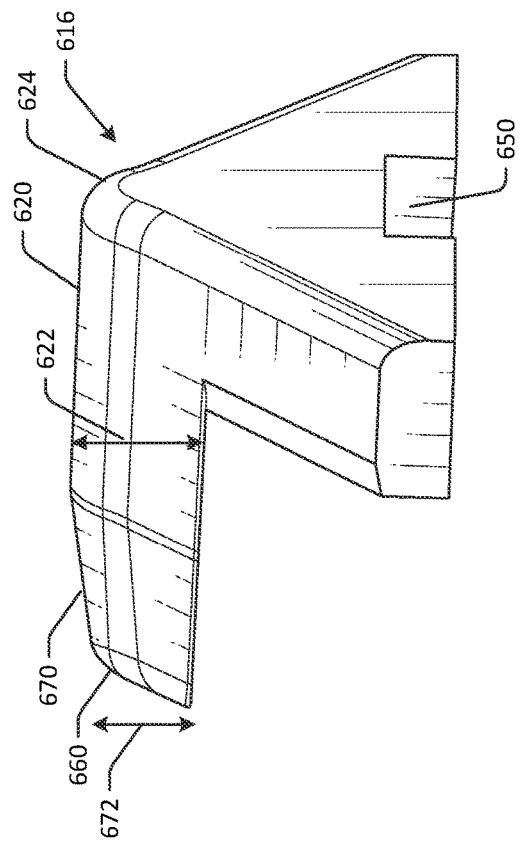
Figure 6A:
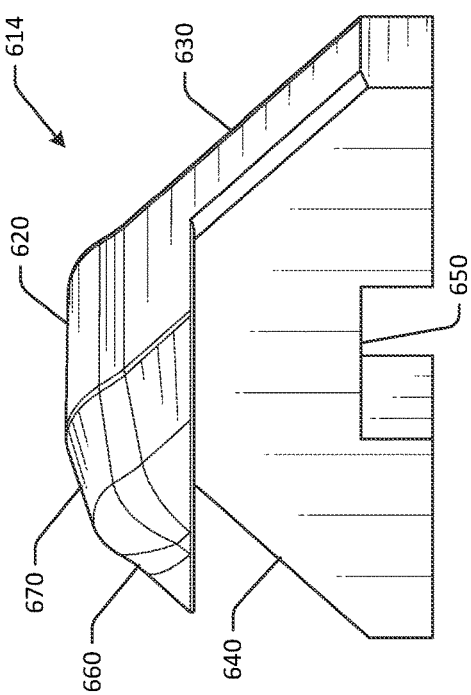
Figure 6B:
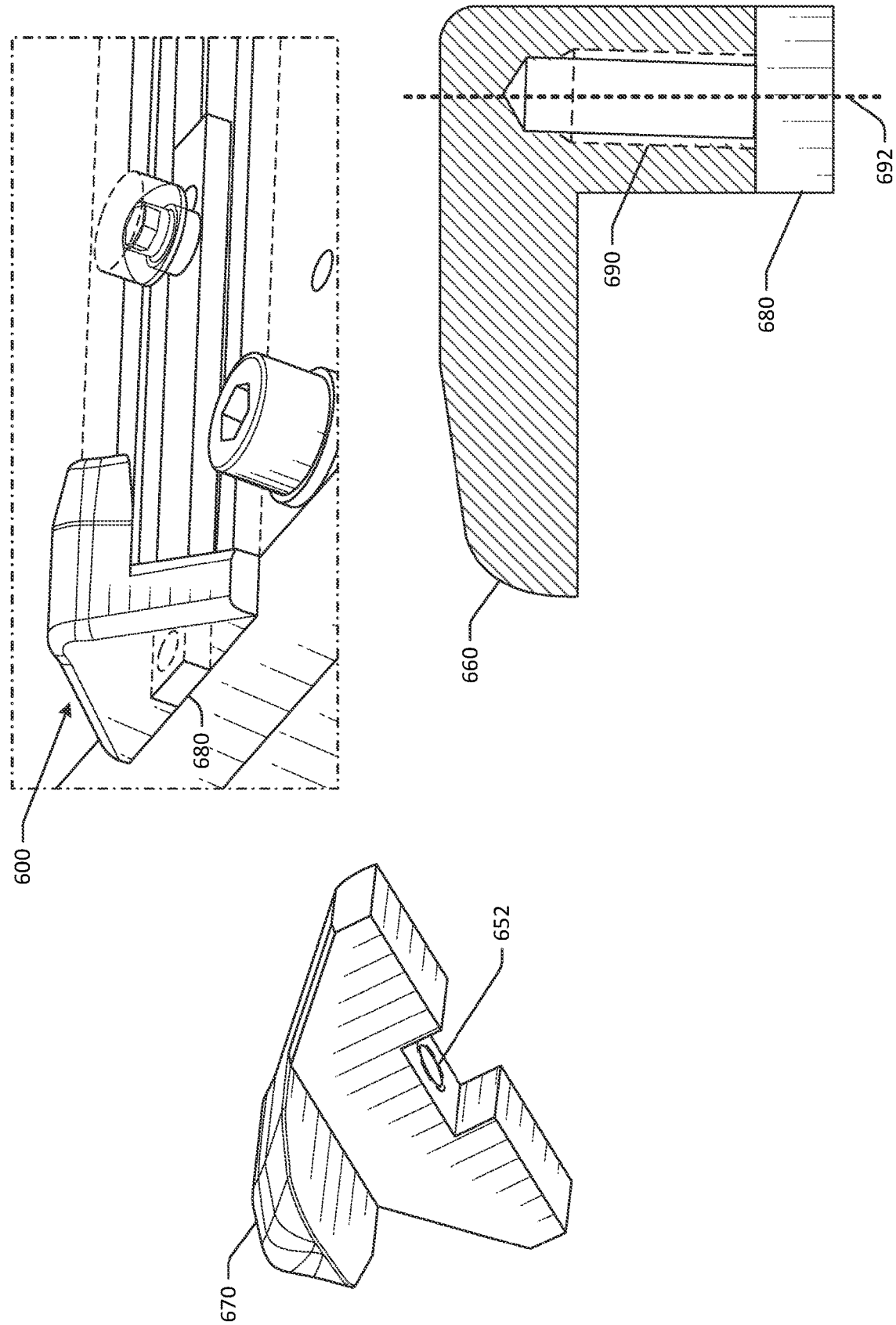

FIGS. 6A-6B are schematic illustrations of a transition component 600 in various views in accordance with one or more embodiments of the disclosure. Other embodiments may include additional or fewer components. The illustrations of FIGS. 6A-6B are not to scale, and may not be illustrated to scale with respect to other figures. The systems illustrated in FIGS. 6A-6B may be the same systems discussed with respect to FIGS. 1-5B.

In FIG. 6A, the transition component 600 is depicted in a rear view 610, a front view 612, a front perspective view 614, and a rear perspective view 616. The transition component 600 may be coupled to a rail. The transition component 600 may be configured to transfer a load of the shuttle from the first side surface and the second side surface of the v-groove portion of the wheel to the middle portion of the wheel.

The transition component 600 may include a first sidewall 630, a second sidewall 640, and a rounded upper surface 620. The transition component 600 may include a cutout portion 650 that can be used to secure the transition component 600 to a rail via an elongated member.

The transition component 600 may include a chamfered or rounded front end 660. The transition component 600 may include an angled portion or a ramp portion 670 having a first incline angle. The transition component 600 may include a second ramp portion 620 having a second incline angle that is less than the first incline angle. Accordingly, as the shuttle wheel moves along the first ramp portion 670, a greater change in elevation may occur relative to when the wheel moves along the second ramp portion 620. The first ramp portion 670 may have a first length, and the second ramp portion 620 may have a second length that is greater than the first length. The first ramp portion 670 may have a tapered width in that a width of the first ramp portion 670 is greater adjacent to the second ramp portion 620 than at the front end 660. A first height 672 of the first ramp portion 660 and/or at the front end 660 of the transition component 600 may be less than a second height 622 of the transition component 600 at the second ramp portion 620. A rounded edge 624 may be formed at a rear end of the transition component 600.

In FIG. 6B, the transition component 600 may include an offset blind hole 652 formed in a base 690 of the transition component 600. The offset blind hole 652 may be disposed in the second ramp portion 620, such that a clamping force is applied between the first ramp portion 670 and the first rail to which the transition component 600 is coupled. The transition component 600 may be coupled to the rail using an elongated member 680. The offset blind hole 652 may extend into the base 690 and may be offset from a vertical axis 692, so as to provide a clamping or downward force at the front end 660 of the transition component 600. The offset blind hole 652 may be an angled blind hole with respect to a vertical axis.

The transition component 600 may have a length that is equal to or less than a circumference of the shuttle wheel. The transition component 600 may therefore include a first rounded end, a first ramp portion having a first incline angle adjacent to the first rounded end, a second ramp portion having a second incline angle adjacent to the first ramp portion, where the second incline angle is less than the first incline angle, and a second rounded end adjacent to the second ramp portion.

Accordingly, some embodiments may include an item sortation system having a shuttle configured to transport individual items from through the item sortation system, the shuttle including a first wheel and a second wheel, where the first wheel and the second wheel are v-groove wheels, and where the respective v-grooves are formed by two side surfaces and a relief groove disposed about a center of the wheel. The system may include a first track disposed on a first level of the item sortation system and configured to guide the shuttle through the first level of the item sortation system, the first track having a first rail and a second rail, where the first rail is configured to engage a first side surface and a second side surface of the v-groove of the first wheel, and the second rail is configured to engage a first side surface and a second side surface of the v-groove of the second wheel. The system may include a first shuttle transition block coupled to a first end of the first rail, where the first shuttle transition block is configured to engage a first relief groove of the v-groove of the first wheel, and a second shuttle transition block coupled to a second end of the second rail, where the second shuttle transition block is configured to engage a second relief groove of the v-groove of the second wheel.

The system may include a shuttle elevator configured to transport the shuttle from the first level of the item sortation system to a second level of the item sortation system, the shuttle elevator having a second track configured to guide the shuttle onto and off the shuttle elevator, the second track including a third rail and a fourth rail, where the third rail is configured to engage the first side surface and the second side surface of the v-groove of the first wheel, and the fourth rail is configured to engage the first side surface and the second side surface of the v-groove of the second wheel. The system may include a third shuttle transition block coupled to a third end of the third rail, where the third shuttle transition block is configured to engage the first relief groove of the v-groove of the first wheel, and a fourth shuttle transition block coupled to a fourth end of the fourth rail, where the fourth shuttle transition block is configured to engage the second relief groove of the v-groove of the second wheel.

A load of the shuttle may be transferred from the side surfaces of the v-grooves of the respective first wheel and second wheel to the relief grooves of the v-grooves of the respective first wheel and second wheel as the shuttle moves from the first rail and the second rail to the first shuttle transition block and the second shuttle transition block.

One or more operations of the methods, process flows, or use cases of FIGS. 1-6B may have been described above as being performed by a user device, or more specifically, by one or more program module(s), applications, or the like executing on a device. It should be appreciated, however, that any of the operations of the methods, process flows, or use cases of FIGS. 1-6B may be performed, at least in part, in a distributed manner by one or more other devices, or more specifically, by one or more program module(s), applications, or the like executing on such devices. In addition, it should be appreciated that processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-6B may be described in the context of the illustrative devices, it should be appreciated that such operations may be implemented in connection with numerous other device configurations.

The operations described and depicted in the illustrative methods, process flows, and use cases of FIGS. 1-6B may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-6B may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by the execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Computer Architecture

Figure 7:
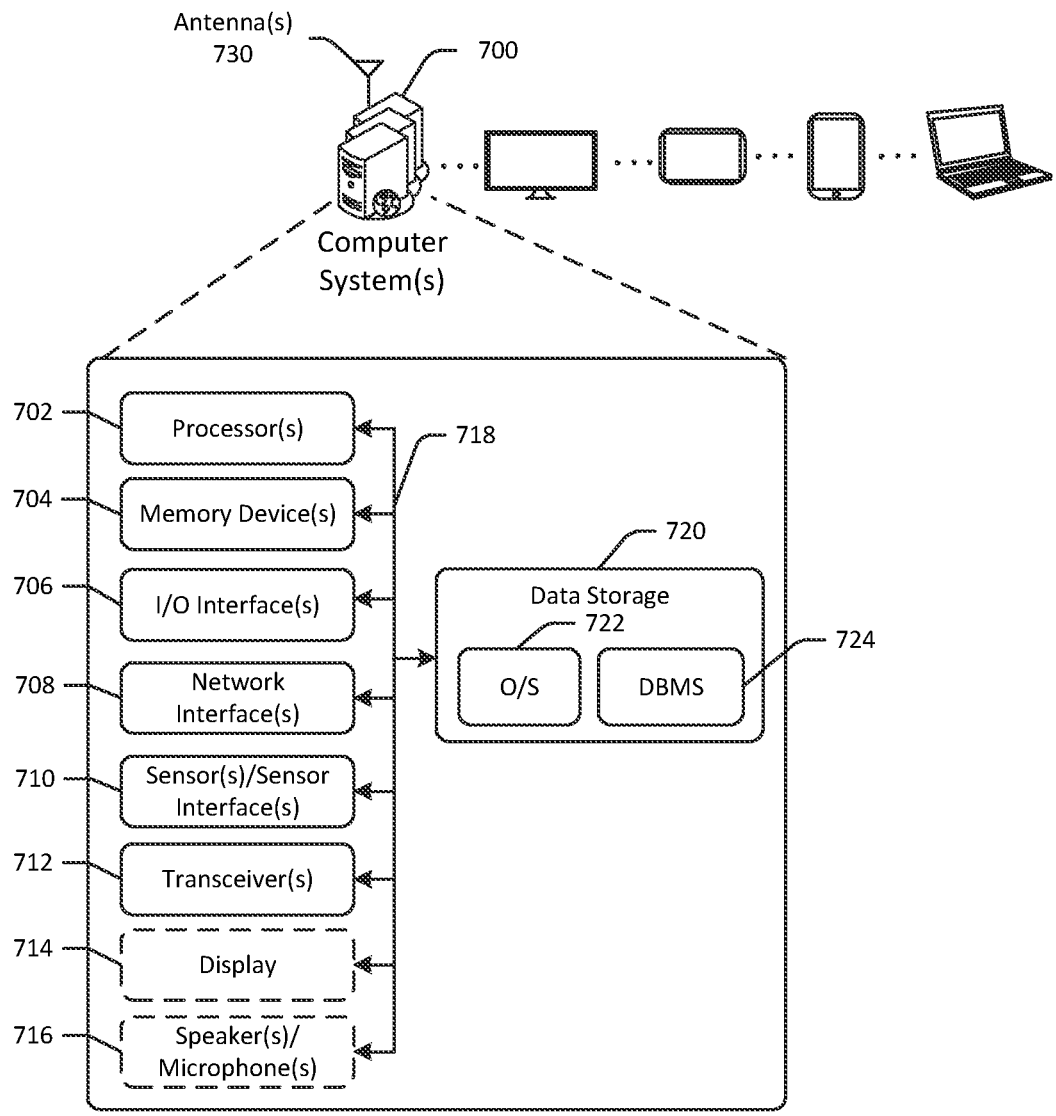
FIG. 7 schematically illustrates an example architecture of a computer system associated with a shuttle system in accordance with one or more embodiments of the disclosure.

FIG. 7 is a schematic block diagram of one or more illustrative computer system(s) 700 associated with a shuttle rail system in accordance with one or more example embodiments of the disclosure. The computer system(s) 700 may include any suitable computing device including, but not limited to, a server system, a voice interaction device, a mobile device such as a smartphone, a tablet, an e-reader, a wearable device, or the like; a desktop computer; a laptop computer; a content streaming device; or the like. The computer system(s) 700 may correspond to an illustrative device configuration for the controller(s) or computer system(s) of FIGS. 1-6B. For example, the computer system(s) 700 may be a controller and may control one or more aspects of the shuttles described in FIGS. 1-6B and/or may be configured to direct movement of shuttles along tracks to certain delivery locations.

The computer system(s) 700 may be configured to communicate with one or more servers, user devices, or the like. The computer system(s) 700 may be configured to control shuttle movement, conveyor movement, rail switches, identify shuttles, direct shuttles, move shuttles, and so forth.

The computer system(s) 700 may be configured to communicate via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computer system(s) 700 may include one or more processors (processor(s)) 702, one or more memory devices 704 (also referred to herein as memory 704), one or more input/output (I/O) interface(s) 706, one or more network interface(s) 708, one or more sensor(s) or sensor interface(s) 710, one or more transceiver(s) 712, one or more optional display(s) 714, one or more optional microphone(s) 716, and data storage 720. The computer system(s) 700 may further include one or more bus(es) 718 that functionally couple various components of the computer system(s) 700. The computer system(s) 700 may further include one or more antenna(s) 730 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 718 may include at least one of a system bus, a memory bus, an address bus, or a message bus, and may permit the exchange of information (e.g., data (including computer-executable code), signaling, etc.) between various components of the computer system(s) 700. The bus(es) 718 may include, without limitation, a memory bus or a memory controller, a peripheral bus, an accelerated graphics port, and so forth. The bus(es) 718 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnect (PCI) architecture, a PCI-Express architecture, a Personal Computer Memory Card International Association (PCMCIA) architecture, a Universal Serial Bus (USB) architecture, and so forth.

The memory 704 of the computer system(s) 700 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 704 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 704 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 720 may include removable storage and/or non-removable storage including, but not limited to, magnetic storage, optical disk storage, and/or tape storage. The data storage 720 may provide non-volatile storage of computer-executable instructions and other data. The memory 704 and the data storage 720, removable and/or non-removable, are examples of computer-readable storage media (CRSM) as that term is used herein.

The data storage 720 may store computer-executable code, instructions, or the like that may be loadable into the memory 704 and executable by the processor(s) 702 to cause the processor(s) 702 to perform or initiate various operations. The data storage 720 may additionally store data that may be copied to the memory 704 for use by the processor(s) 702 during the execution of the computer-executable instructions. Moreover, output data generated as a result of execution of the computer-executable instructions by the processor(s) 702 may be stored initially in the memory 704, and may ultimately be copied to the data storage 720 for non-volatile storage.

More specifically, the data storage 720 may store one or more operating systems (O/S) 722; one or more database management systems (DBMS) 724; and one or more program module(s), applications, engines, computer-executable code, scripts, or the like. Some or all of these module(s) may be sub-module(s). Any of the components depicted as being stored in the data storage 720 may include any combination of software, firmware, and/or hardware. The software and/or firmware may include computer-executable code, instructions, or the like that may be loaded into the memory 704 for execution by one or more of the processor(s) 702. Any of the components depicted as being stored in the data storage 720 may support functionality described in reference to corresponding components named earlier in this disclosure.

The data storage 720 may further store various types of data utilized by the components of the computer system(s) 700. Any data stored in the data storage 720 may be loaded into the memory 704 for use by the processor(s) 702 in executing computer-executable code. In addition, any data depicted as being stored in the data storage 720 may potentially be stored in one or more datastore(s) and may be accessed via the DBMS 724 and loaded in the memory 704 for use by the processor(s) 702 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like.

The processor(s) 702 may be configured to access the memory 704 and execute the computer-executable instructions loaded therein. For example, the processor(s) 702 may be configured to execute the computer-executable instructions of the various program module(s), applications, engines, or the like of the computer system(s) 700 to cause or facilitate various operations to be performed in accordance with one or more embodiments of the disclosure. The processor(s) 702 may include any suitable processing unit capable of accepting data as input, processing the input data in accordance with stored computer-executable instructions, and generating output data. The processor(s) 702 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 702 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 702 may be capable of supporting any of a variety of instruction sets.

Referring now to other illustrative components depicted as being stored in the data storage 720, the O/S 722 may be loaded from the data storage 720 into the memory 704 and may provide an interface between other application software executing on the computer system(s) 700 and the hardware resources of the computer system(s) 700. More specifically, the O/S 722 may include a set of computer-executable instructions for managing the hardware resources of the computer system(s) 700 and for providing common services to other application programs (e.g., managing memory allocation among various application programs). In certain example embodiments, the O/S 722 may control execution of the other program module(s). The O/S 722 may include any operating system now known or which may be developed in the future including, but not limited to, any server operating system, any mainframe operating system, or any other proprietary or non-proprietary operating system.

The DBMS 724 may be loaded into the memory 704 and may support functionality for accessing, retrieving, storing, and/or manipulating data stored in the memory 704 and/or data stored in the data storage 720. The DBMS 724 may use any of a variety of database models (e.g., relational model, object model, etc.) and may support any of a variety of query languages. The DBMS 724 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the computer system(s) 700 is a mobile device, the DBMS 724 may be any suitable lightweight DBMS optimized for performance on a mobile device.

Referring now to other illustrative components of the computer system(s) 700, the input/output (I/O) interface(s) 706 may facilitate the receipt of input information by the computer system(s) 700 from one or more I/O devices as well as the output of information from the computer system(s) 700 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computer system(s) 700 or may be separate. The I/O devices may further include, for example, any number of peripheral devices such as data storage devices, printing devices, and so forth.

The I/O interface(s) 706 may also include an interface for an external peripheral device connection such as universal serial bus (USB), FireWire, Thunderbolt, Ethernet port or other connection protocol that may connect to one or more networks. The I/O interface(s) 706 may also include a connection to one or more of the antenna(s) 730 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, a ZigBee network, etc.

The computer system(s) 700 may further include one or more network interface(s) 708 via which the computer system(s) 700 may communicate with any of a variety of other systems, platforms, networks, devices, and so forth. The network interface(s) 708 may enable communication, for example, with one or more wireless routers, one or more host servers, one or more web servers, and the like via one or more networks.

The antenna(s) 730 may include any suitable type of antenna depending, for example, on the communications protocols used to transmit or receive signals via the antenna(s) 730. Non-limiting examples of suitable antenna(s) may include directional antenna(s), non-directional antenna(s), dipole antenna(s), folded dipole antenna(s), patch antenna(s), multiple-input multiple-output (MIMO) antenna(s), or the like. The antenna(s) 730 may be communicatively coupled to one or more transceivers 712 or radio components to which or from which signals may be transmitted or received.

As previously described, the antenna(s) 730 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(s) 730 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(s) 730 may be configured to transmit or receive radio frequency signals within any suitable frequency range forming part of the unlicensed portion of the radio spectrum.

The antenna(s) 730 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 712 may include any suitable radio component(s) for—in cooperation with the antenna(s) 730—transmitting or receiving radio frequency (RF) signals in the bandwidth and/or channels corresponding to the communications protocols utilized by the computer system(s) 700 to communicate with other devices. The transceiver(s) 712 may include hardware, software, and/or firmware for modulating, transmitting, or receiving—potentially in cooperation with any of antenna(s) 730—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 712 may further include hardware, firmware, or software for receiving GNSS signals. The transceiver(s) 712 may include any known receiver and baseband suitable for communicating via the communications protocols utilized by the computer system(s) 700. The transceiver(s) 712 may further include a low noise amplifier (LNA), additional signal amplifiers, an analog-to-digital (A/D) converter, one or more buffers, a digital baseband, or the like.

The sensor(s)/sensor interface(s) 710 may include or may be capable of interfacing with any suitable type of sensing device such as, for example, inertial sensors, force sensors, thermal sensors, photocells, and so forth. Example types of inertial sensors may include accelerometers (e.g., MEMS-based accelerometers), gyroscopes, and so forth.

The optional display(s) 714 may be configured to output light and/or render content. The optional speaker(s)/microphone(s) 716 may be any device configured to receive analog sound input or voice data.

It should be appreciated that the program module(s), applications, computer-executable instructions, code, or the like depicted in FIG. 7 as being stored in the data storage 720 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the computer system(s) 700, and/or hosted on other computing device(s) accessible via one or more networks, may be provided to support functionality provided by the program module(s), applications, or computer-executable code depicted in FIG. 7 and/or additional or alternate functionality. Further, functionality may be modularized differently such that processing described as being supported collectively by the collection of program module(s) depicted in FIG. 7 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 7 may be implemented, at least partially, in hardware and/or firmware across any number of devices.

It should further be appreciated that the computer system(s) 700 may include alternate and/or additional hardware, software, or firmware components beyond those described or depicted without departing from the scope of the disclosure. More particularly, it should be appreciated that software, firmware, or hardware components depicted as forming part of the computer system(s) 700 are merely illustrative and that some components may not be present or additional components may be provided in various embodiments. While various illustrative program module(s) have been depicted and described as software module(s) stored in the data storage 720, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A system configured to transport items, the system comprising:
    a shuttle configured to support an item, the shuttle comprising a first wheel, wherein the first wheel has a first side surface, a second side surface, and a middle portion that together form a v-groove;
    a first rail configured to engage the first side surface and the second side surface;
    a second rail configured to engage the first side surface and the second side surface, wherein the second rail is separated from the first rail; and
    a first transition block coupled to the first rail, the first transition block configured to transfer a load of the shuttle from the first side surface and the second side surface to the middle portion of the wheel, wherein the first transition block comprises:
        a first ramp portion having a first incline angle; and
        a second ramp portion having a second incline angle that is less than the first incline angle.

2. The system of claim 1, further comprising:
    a second transition block coupled to the second rail, the second transition block configured to transfer the load of the shuttle from the middle portion of the wheel to the first side surface and the second side surface of the wheel.

3. The system of claim 2, wherein the first transition block is in a first orientation and the second transition block is in a second orientation that is opposite the first orientation.

4. The system of claim 1, wherein the first ramp portion has a first length, and the second ramp portion has a second length that is greater than the first length.

5. The system of claim 1, wherein the first ramp portion has a tapered width.

6. The system of claim 1, wherein the first transition block comprises:
   a base; and
   an angled blind hole disposed in the base.

7. The system of claim 1, wherein the first transition block has a length that is equal to or less than a circumference of the first wheel.

8. The system of claim 1, wherein the first rail does not engage the middle portion of the first wheel, and the second rail does not engage the middle portion of the first wheel.

9. The system of claim 1, wherein the second rail is configured to move vertically with respect to the first rail.

10. The system of claim 1, wherein the shuttle further comprises a permanent magnet coupled to a lower surface of the shuttle, and wherein the system further comprises:
    a set of electromagnets;
    wherein the permanent magnet is configured to engage with the set of electromagnets to propel the shuttle.

11. An item delivery system comprising:
    a shuttle configured to support an item, the shuttle comprising a wheel, wherein the wheel has a first side surface, a second side surface, and a middle portion that together form a v-groove;
    a first rail configured to engage the first side surface and the second side surface;
    a second rail configured to engage the first side surface and the second side surface, wherein the second rail is separated from the first rail;
    a first transition block coupled to the first rail, the first transition block configured to transfer a load of the shuttle from the first side surface and the second side surface to the middle portion of the wheel, wherein the first transition block comprises a base, and an angled blind hole disposed in the base; and
    a second transition block coupled to the second rail, the second transition block configured to transfer the load of the shuttle from the middle portion of the wheel to the first side surface and the second side surface of the wheel.

12. The item delivery system of claim 11, wherein the first transition block comprises:
    a first ramp portion having a first incline angle; and
    a second ramp portion having a second incline angle that is less than the first incline angle.

13. The item delivery system of claim 12, wherein the first ramp portion has a first length, and the second ramp portion has a second length that is greater than the first length; and
    wherein the first ramp portion has a tapered width.

14. The item delivery system of claim 11, wherein the shuttle further comprises a permanent magnet coupled to a lower surface of the shuttle, and wherein the system further comprises:
    a set of electromagnets;
    wherein the permanent magnet is configured to engage with the set of electromagnets to propel the shuttle.

15. A system configured to transport items, the system comprising:
    a shuttle configured to support an item, the shuttle comprising a first wheel, wherein the first wheel has a first side surface, a second side surface, and a middle portion that together form a v-groove;
    a first rail configured to engage the first side surface and the second side surface;
    a second rail configured to engage the first side surface and the second side surface, wherein the second rail is separated from the first rail; and
    a first transition block coupled to the first rail, the first transition block configured to transfer a load of the shuttle from the first side surface and the second side surface to the middle portion of the wheel, wherein the first transition block has a length that is equal to or less than a circumference of the first wheel.

16. The system of claim 15, further comprising:
    a second transition block coupled to the second rail, the second transition block configured to transfer the load of the shuttle from the middle portion of the wheel to the first side surface and the second side surface of the wheel.

17. The system of claim 15, wherein the first transition block is in a first orientation and the second transition block is in a second orientation that is opposite the first orientation.

18. The system of claim 15, wherein the first rail does not engage the middle portion of the first wheel, and the second rail does not engage the middle portion of the first wheel.

19. The system of claim 15, wherein the first transition block comprises:
    a base; and
    an angled blind hole disposed in the base.

20. The system of claim 15, wherein the first transition block has a length that is equal to or less than a circumference of the first wheel.

* * * * *